(12) United States Patent
Aylesworth

(10) Patent No.: US 10,888,819 B1
(45) Date of Patent: *Jan. 12, 2021

(54) OSMOSIS SYSTEM USING A MAGNETIC NANOPARTICLE DRAW SOLUTION AND PERMANENT RING-TYPE MAGNETS

(71) Applicant: Terrence W. Aylesworth, Algonquin, IL (US)

(72) Inventor: Terrence W. Aylesworth, Algonquin, IL (US)

(*) Notice: Subject to any disclaimer, the term of this patent is extended or adjusted under 35 U.S.C. 154(b) by 905 days.

This patent is subject to a terminal disclaimer.

(21) Appl. No.: 15/005,600

(22) Filed: Jan. 25, 2016

Related U.S. Application Data

(63) Continuation-in-part of application No. 13/987,129, filed on Jul. 1, 2013, now Pat. No. 9,334,748, and a
(Continued)

(51) Int. Cl.
*B01D 61/00* (2006.01)
*B01D 63/04* (2006.01)
(Continued)

(52) U.S. Cl.
CPC ......... *B01D 61/005* (2013.01); *B01D 61/002* (2013.01); *B01D 61/027* (2013.01);
(Continued)

(58) Field of Classification Search
CPC .. B01D 61/002; B01D 61/005; B01D 61/027; B01D 63/043; B01D 2311/2607;
(Continued)

(56) References Cited

U.S. PATENT DOCUMENTS 2,116,920 A 3/1965 Wickenden
3,171,799 A 3/1965 Batchelder
(Continued)

FOREIGN PATENT DOCUMENTS

GB 2464956 A * 5/2010 ........... B01D 61/002

OTHER PUBLICATIONS

Ming Ming Ling et al, "Highly Water-Soluble Magnetic Nanoparticles as Novel Draw Solutes in Forward Osmosis for Water Reuse", Ind. Eng. Chem. Res., Published 2010 in vol. 10, pp. 5869-5876. (Year: 2010).*
(Continued)

*Primary Examiner* — Joseph W Drodge
(74) *Attorney, Agent, or Firm* — David A. Gottardo, Attorney at Law

(57) ABSTRACT

A forward or pressure retarded osmosis system using submerged hollow fiber membranes, a draw solution of superparamagnetic nanoparticles (preferably an iron oxide core with a silica shell that is chemically treated with a dispersant stabilizing it in a permanent suspension), that produces an osmotic pressure that drives fluid through the semipermeable membrane and a multiplicity of rigidly connected, permanent ring magnets forming layers, that maintains the locational position of the magnetic nanoparticles inside the hollow fiber membranes, preventing the draw solute particles from leaving membrane surface area. The various magnetic fields produced by the ring magnets attract the magnetic nanoparticles toward the surface area of the membrane preventing dilutive concentration polarization, thereby maximizing permeate flux rate.

7 Claims, 7 Drawing Sheets

Related U.S. Application Data continuation-in-part of application No. 13/507,538, filed on Jul. 6, 2012, now Pat. No. 9,242,213.

(51) Int. Cl.
  *C02F 1/44* (2006.01)
  *C02F 1/48* (2006.01)
  *B01D 61/02* (2006.01)
  *C02F 103/08* (2006.01)

(52) U.S. Cl.
  CPC ............ B01D 63/043 (2013.01); C02F 1/442 (2013.01); C02F 1/445 (2013.01); C02F 1/481 (2013.01); *B01D 2311/2607* (2013.01); *C02F 2103/08* (2013.01); *C02F 2305/08* (2013.01)

(58) Field of Classification Search
  CPC ........ B01D 61/00; B01D 63/00; B01D 65/00; B01D 2311/04; B01D 2311/10; B01D 2311/103; B01D 2311/106; B01D 2311/12; B01D 2311/25; B01D 2311/2626; C02F 1/442; C02F 1/445; C02F 1/481; C02F 2103/08; C02F 2305/08; C02F 2209/02; C02F 2209/005; C02F 2303/16; C02F 2311/2626; C02F 2315/16; C02F 1/02; C02F 1/44; C02F 1/447; C02F 1/16; C02F 1/20; C01G 49/04; C01G 49/06; C08J 9/008
  USPC ....... 210/637, 639, 644, 649, 650, 652, 177, 210/198.1, 195.1, 805; 423/138, 632, 423/633; 428/403, 404; 977/773
  See application file for complete search history.

(56) References Cited

U.S. PATENT DOCUMENTS

| | | | |
|---|---|---|---|
| 6,514,481 B1 * | 2/2003 | Prasad | A61N 1/406 |
| | | | 324/307 |
| 8,815,091 B2 * | 8/2014 | McGinnis | B01D 61/002 |
| | | | 210/321.76 |
| 9,242,213 B1 * | 1/2016 | Aylesworth | C02F 1/442 |
| 9,334,748 B1 * | 5/2016 | Aylesworth | C02F 1/442 |
| 9,342,213 B2 * | 5/2016 | Jung | G06F 3/041 |
| 10,038,331 B1 * | 7/2018 | Aylesworth | F03G 7/005 |
| 2004/0007527 A1 * | 1/2004 | Pedersen | B01D 65/102 |
| | | | 210/650 |
| 2004/0211726 A1 * | 10/2004 | Baig | B01D 53/22 |
| | | | 210/640 |
| 2007/0278153 A1 | 12/2007 | Oriard | |
| 2009/0308727 A1 * | 12/2009 | Kirts | C02F 1/445 |
| | | | 203/11 |
| 2010/0051557 A1 | 3/2010 | Etemad et al. | |
| 2012/0037840 A1 * | 2/2012 | Stucky | B01J 20/103 |
| | | | 252/62.53 |
| 2013/0030206 A1 * | 1/2013 | Woo | C01G 49/08 |
| | | | 556/146 |
| 2013/0213885 A1 * | 8/2013 | Duan | B01D 61/002 |
| | | | 210/636 |

OTHER PUBLICATIONS

Cath et al., Forward Osmosis: Principles, Applications and Recent Developments, Journal of Membrane Science, 281 (2006) 70-87.
Ge et al., Hydrophilic Superparamagnetic Nanoparticles: Synthesis, Characterization and Performance in Forward Osmosis Proceses, Ind. Eng. Chem. Res. (2011), 50, 382-388.
McCutcheon et al., Influence of Concentrative and Dilutive Internal Concentration Polarization on Flux Behavior in Forward Osmosis, Journal of Membrane Science, 284 (2006) 237-247.

* cited by examiner

OSMOSIS SYSTEM USING A MAGNETIC NANOPARTICLE DRAW SOLUTION AND PERMANENT RING-TYPE MAGNETS

CROSS REFERENCE TO RELATED APPLICATIONS

This application is a continuation-in-part of both U.S. Non-provisional Pat. No. 9,242,213 issued on Jan. 26, 2016 and U.S. Non-provisional Pat. No. 9,334,748 issued on May 10, 2016. The disclosures of each of the foregoing applications are thus incorporated by reference herein.

TECHNICAL FIELD OF THE INVENTION

This invention pertains to osmosis systems processing of fluids. More particularly, it pertains to forward and pressure retarded osmosis systems using hollow fiber membranes, a colloidal magnetic nanoparticle draw solution, and a permanent magnetic field used to maintain the desired position of the magnetic nanoparticles.

Osmosis is a natural and spontaneous movement of water across a selectively permeable membrane from a liquid solution of low solute concentration (pure water) to a liquid solution of comparably higher solute concentration such as seawater. The selectivity of the membrane material allows for the passage of water molecules while preventing the passage of larger solute molecules and suspended solids. The careful, intentional selection of the hollow fiber membrane prevents the passage of unwanted molecules. The natural (non-pressure driven) passage of water through the membrane is driven by the difference in the solute concentrations on either side of the membrane. The bigger the difference is between the two solutions' solute concentrations, the greater the driving force of the solvent to permeate the membrane. This driving force is known as osmotic pressure or the net osmotic driving force. There are three types of osmosis. As discussed by Cath et al. the most familiar is reverse osmosis (RO), which in the field of water treatment, uses mechanically produced, hydraulic pressure to oppose, and exceed, the osmotic pressure of an aqueous feed to produce purified water. A second type of osmosis is forward osmosis (FO), which uses the osmotic pressure differential as the driving force for transport across a semipermeable membrane, which acts as a separator media. A third type of osmosis is pressure retarded osmosis (PRO) that uses osmotic pressure differences between seawater, or concentrated brine, and fresh water to pressurize the saline stream, thereby converting the osmotic pressure of seawater into a hydrostatic pressure that can be used to drive a hydroturbine and produce electricity.

The key basis characteristics of an osmosis system are: the type of osmosis (RO, FO, or PRO); the type and configuration of the membrane (tubular, spiral, hollow fiber or flat sheet); and the type and composition of the draw solution. FO is preferred to RO for water purification using several criteria. Of greatest significance is that FO has much lower energy demand. It also has greater water recovery, has benign environmental effects, and it is less subject to environmental fouling. Membranes can either be flat sheet membranes in a plate-and-frame configuration or in a spiral-would configuration; or could be tubular. In turn, tubular membranes can be either tubes or hollow fibers. Cath et al. discuss the advantages of hollow fiber membranes, the biggest advantage of which, is greater membrane surface area per unit volume of the membrane system. Submerged hollow-fiber membrane systems can have several hundred times the surface area of membrane than flat sheet spiral wound membrane systems. Hollow fiber membranes can also support high hydraulic pressure without deforming and can be easily packed in bundles directly within a holding vessel. They are also relatively easy to fabricate in modular form. Also, they allow liquids to flow freely on the feed side of the membrane. Another advantage of hollow fiber membranes is that they are much cheaper to manufacture.

A variety of compositions can be used for the draw solution. In an early commercial application of FO, Wickenden in U.S. Pat. No. 2,116,920 teaches the use of calcium chloride as a draw solution in the concentration of fruit juices. In another early patent, Batchelder in U.S. Pat. No. 3,171,799 teaches the use of a volatile solute, such as sulfur dioxide, in a draw solution for the demineralization of water. Recently, interest in draw solutions has centered on those containing magnetic nanoparticles. Magnetic particles in the draw solution have the advantage of being able to be readily separated from the product water of a purification or desalination process with use of magnetic fields. They can also be readily recycled back into the draw solution. A kind of nanoparticle that is currently of interest is a material referred to as Magnetoferritins. As Oriard et al. describe in US 2007/0278153, it is magnetite bound to a protein such as ferritin wherein the magnetite is the core and the protein is the spherical cover. The use of magnetite nanoparticles is also taught by Etemad et al. in US 2010/0051557 in the context of removing heavy metals from aqueous media by means of adsorption and magnetic capturing. Etemad et al. mention that the magnetite is superparamagnetic but does not indicate that they are coated with a protein. Superparamagnetic iron oxide nanoparticles (SPIONs) are also the subject of intense research for various biomedical applications as described by Latorre et al.

SUMMARY OF THE INVENTION

This invention is a forward or pressure retarded osmosis system consisting of a submerged hollow fiber membrane unit, a draw solution containing either ultra-small superparamagnetic or ferromagnetic nanoparticles (also called a ferrofluid) within the hollow fiber membranes, and a series of permanent ring magnets around a number of the hollow fiber membranes that create a magnetic field that attracts the magnetic nanoparticles, and maintains their position within the hollow fiber membranes.

The magnetic fields are created by a series of permanent, ring magnets positioned around a bundle of hollow fiber membranes. A bundle of membranes can number in the tens to hundreds of hollow fibers. There are five different types of permanent, ring magnets as shown in FIGS. 4 through 7. They are described as axial, lateral (of which there are two different types), multi-pole, and uni-polar. The north end of the magnet is shown in black and the south-pole end is shown as light gray. The direction of the field force is always from the south-pole toward the north-pole.

The selection and application of the particular type of ring magnet within the submerged hollow fiber membrane system, is intended to counter-act the forces created by the water as it permeates the membrane. The two water forces affecting the position of the nanoparticles are; 1) the incoming water permeating the membrane, pushing the nanoparticle away from the membrane's active surface area, and 2) the linear flow of permeate water through the hollow fiber membrane. Furthermore, the magnetic fields created by the series of magnets, are designed to maintain the optimal nanoparticle position (its physical location within the hollow fiber) at the active surface of the membrane, such as to result in the highest osmotic pressure and greatest resulting water flux rate that can be achieved. The selection of the type of magnet and its position along the fiber length may alternate (for example, axial followed by radial, then followed by axial, etc.).

An axial ring magnet (FIG. 4) comprises a north and south end of a magnet and produces a magnetic field force that is directed axially, pointing outward relative to the ring-shaped magnet. The shape of the magnetic force repels the magnetic nanoparticles (MNP), forcing them to move along the axis of the ring magnet in the direction of the arrow in the FIG. 4.

A lateral field shape can be classified as an outer-diameter Halbach (FIG. 5) or an inner-diameter Halbach, (not pictured). The outer-diameter Halbach consists of alternating north and south magnetic material sections on the outside perimeter of the magnet, with a non-magnetic material on the inside perimeter. The inner-diameter Halbach ring magnet (not pictured) has the north and south magnetic material sections forming the inside of the ring, with the non-magnetic material on the outside perimeter of the ring. The magnetic field shape loops from each south-pole arc to its two neighboring north-pole arcs. Magnetic nanoparticle solution within the hollow fibers, going through the center of the ring magnet, is forced toward the nearest north-pole arc section.

The multi-pole ring magnet (FIG. 6) consists of north and south magnetic material arcs, with each arc in an alternating pattern, on the inside and outside of the ring. The resulting magnetic field shape is in all cases radial relative to the ring magnet, with field forces pointing toward, and pointing away from the center of the ring, in alternating fashion according to each respective magnetic arc.

The uni-polar radial ring magnet (FIG. 7) consists of south-pole magnetic material on the inside of the ring, and north-pole magnetic material on the outside of the ring. The resulting magnetic field is radial, with the direction of magnetic flux pointing from the center of the ring toward the outside of the ring. Magnetic nanoparticles within the hollow fiber membrane stands, bunched together on the inside of the ring, are magnetically forced toward the outside of each respective hollow fiber membrane to the side closest to the ring magnet.

Optimal nanoparticle draw solute position control can have a significant, beneficial effect on Concentration Polarization. As reported in the journal article "Influence of concentrative and dilutive internal concentration polarization on flux behavior in forward osmosis," by Jeffrey R. McCutcheon, Menachem Elimelech, concentration polarization results from incoming permeate water diluting the draw solution concentration, thus causing a reduced net osmotic pressure gradient within the membrane system. As the magnetic nanoparticles are forced to the outside walls of the hollow fiber membranes by the ring magnets, they counter-act the force of the incoming water permeating the membrane, thus reducing the negative effects of Dilutive Concentration Polarization, which dilutes the solute solution concentration and causes forward osmosis inefficiency.

The ring permanent magnets are of relative high magnetic flux density material composed of rare earth metal compounds such as neodymium iron boron (NdFeB), samarium cobalt (SnCo), or Yttrium Cobalt (YCo). Due to the flux density decreasing exponentially with increasing distance from the magnet's surface, and the fixed and finite flux density of each particular rare-earth magnetic material, the relative flux density strength imparted upon the magnetic nanoparticle is controlled by varying the distance from the magnet to the magnetic nanoparticles. This is done by choosing an appropriate size of ring magnet, and correspondingly the size of the hollow fiber membrane bundle. That way, sufficient magnetic flux density would be available to have the intended effect on the magnetic nanoparticles on the inside of the hollow fibers.

Furthermore, the size or thickness of the ring magnets can also be varied along the length of the hollow fiber membrane to correspond with the relative flux density required to cause the desired effect (the effects of both preventing the particle from being swept linearly away from the membrane surface and the effect of counter-acting the radial, inward flow of water flux transporting through the hollow fiber membrane). One end of the hollow fiber membrane stand bundle terminates at a closed valve. Since water will permeate the membrane stand throughout its length, the greater the distance away from the valved end of the membrane bundle, the higher the permeate water velocity inside the fiber. These various water velocities throughout the fiber length would create different shear forces that the permeate water would have on the nanoparticles. The higher the permeate water flow rate, the higher the magnetic flux density required to prevent the magnetic nanoparticle form being swept away. The different shear forces would require that various magnetic flux densities (from varying size ring magnets) would be required to maintain the position of the nanoparticles at the membrane surface, throughout the length of the hollow fiber membrane.

The key engineering goal is to maximize the water permeation rate by optimizing the proximity of as much of the magnetic nanoparticle solution to the active membrane surface, as possible. A magnetic flux that is too strong would result in attracting the magnetic nanoparticle too strongly to the membrane surface, physically blocking (or plugging) the membrane pores with the nanoparticles and preventing permeation of water across the membrane into the hollow fiber. Therefore, the engineering challenge is to find the balanced state of equilibrium between the optimal attractive force of the magnetic nanoparticles toward the magnets and the surface of the hollow fiber membrane, and the effect of the water flux rate permeating the membrane pores, causing the corresponding Concentration Polarization. The optimal balance between these forces will position the magnetic draw solute nanoparticles at the membrane working surface such that maximum osmotic pressure is achieved and the greatest permeate water flux rate is realized.

Thus one object of the invention is the use of a superparamagnetic nanoparticle solution as a draw solution in a forward osmosis system to generate an osmotic driving force of pure water through the membrane. The magnetic characteristic of the draw solute is exploited by either containing or detaining the magnetic nanoparticles within the membrane system with a magnetic field. Thus another object of the invention is to use magnetic fields to prevent the loss of superparamagnetic particles in the membrane system product effluent.

Still another object of the invention is to use a submerged hollow fiber membrane, as opposed to a flat-sheet, spiral wound membrane, in order to reduce the effects of feedwater Concentration Polarization. A standard industrial-scale, flat-sheet, spiral-wound membrane consists of a series of cylindrical pressure vessels (each one of which is typically 4 or 8 inches in diameter, and 40-inches long), with several, most often 4 to 6, flat sheet membrane envelopes, each connected to and wrapped around a center of the permeate collection tube. The most common size membrane envelope measures 40-inches long by up to 77 inches wide, for an area of up to 2 square meters of membrane surface area. The membrane sheets are then wrapped around the permeate tube and fitted inside its cylindrical pressure vessel.

The feedwater consists of a relatively small volume of water that must travel in between the wrapped layers of membrane envelopes across the entire length of the membrane sheet surface. As the thin layer of feedwater travels between membrane sheets, it becomes more and more concentrated with contaminants due to the continuous, uninterrupted loss of pure water that permeates the membrane, in the absence of bulk feedwater available to re-dilute it. This build-up of contaminant concentration causes concentration polarization inefficiency within the osmotic process. In embodiments that have permanent ring magnets around hollow fiber membrane stand bundles submerged within the feedwater, the bulk feedwater has increased access to re-dilute feedwater that is concentrating at membrane surface area.

DETAILED DESCRIPTION OF THE INVENTION

Figure 1:
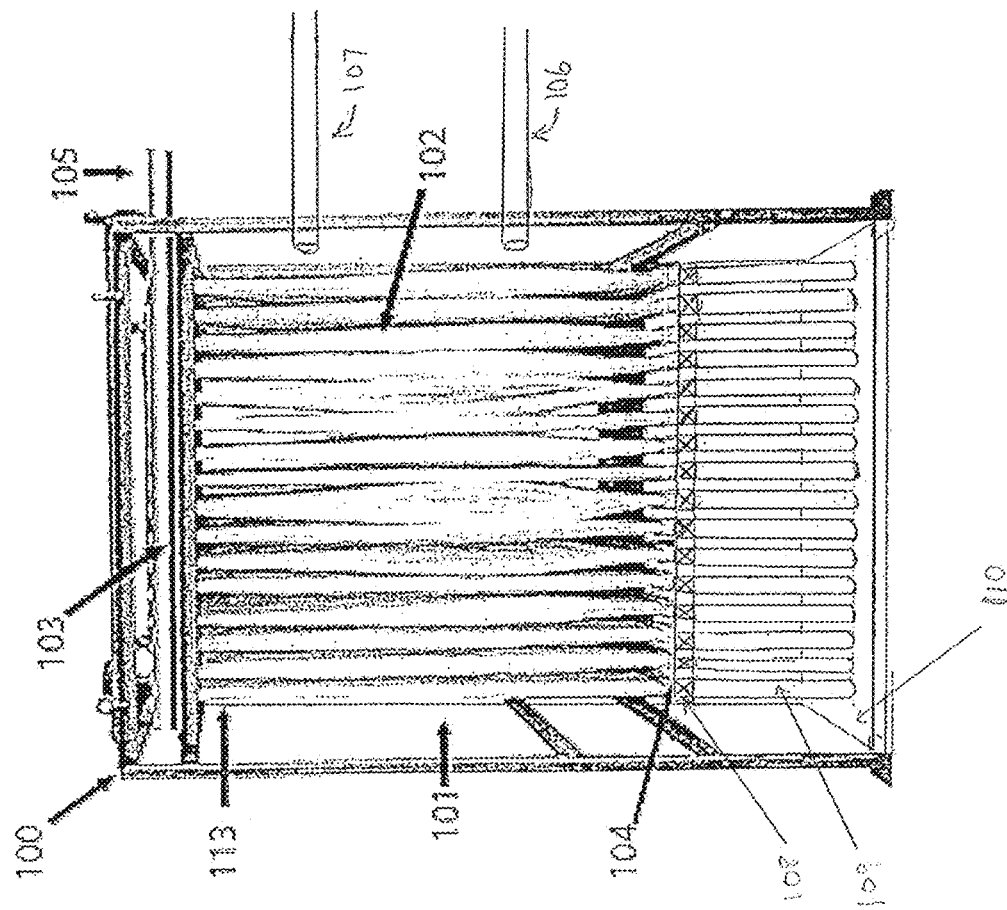
FIG. 1 is a plan view of a submerged, hollow fiber membrane system of an osmosis system.

FIG. 1 is a view of a submerged, hollow-fiber membrane system. It consists of approximately 16 hollow fiber membrane bundles (102), as visible from the front. The hollow-fiber membrane system preferably comprises approximately 10 to 16 membrane bundles deep (the number of membrane bundles is not visible in the figure). Each bundle comprises of hundreds of hollow fiber membranes. Each membrane bundle terminates in a socket at the top that fits into a top header (103), and into a socket at the bottom (104). The bottom socket fits into a valve (108), which is fitted at the top of a solid vertical tube (109), firmly connected to the bottom-floor (110) of the membrane system. The vertical tube is made of a stiff, non-flexible material (one for each membrane stand bundle) and is rigidly connected to the bottom base of the hollow-fiber membrane system frame (110). All of the sockets (both top and bottom) allow for a water-tight seal between the inside of each hollow-fiber membrane stand and the surrounding feedwater, such that the water that is allowed to enter the hollow-fiber membrane must only have permeated the membrane active surface area.

The series of stiff, vertical tubes, (which are all beneath the hollow-fiber membranes) provides for a place for each magnet layer to be moved and to be located, so as to remove the rigid magnetic layers from the active surface area of the membrane. By sliding each rigid magnet layer beneath the hollow-fiber membranes, the magnetic nanoparticles (which are attracted to the ring magnets) are effectively removed from the active membrane surface area. Once the magnetic nanoparticles are removed away from the membrane surface area, the valves can be closed, thus securing the magnetic draw particles away from the membrane surface area. This will prevent the generation of osmotic pressure and put a stop to the permeation of water into the hollow-fiber membranes.

For the sake of clarity, the rigidly connected layers of magnets are not shown in this figure. This entire membrane system including its exterior frame (100) is submerged in feedwater (101). The feedwater may be seawater that the membrane system is submerged within, or if the membrane system is located remotely, away from the source of feedwater (the seawater), the feedwater may be transported to the membrane system via piping. If the membrane system is operated at a location that is remote from the feedwater source, the piping system would need to include both feedwater supply pipe (106) as well as a concentrated feedwater return pipe (107). The return of more highly concentrated seawater to the original seawater source would be required in order to maintain the feedwater dissolved solids concentration. If the feedwater isn't continually changed over with constant supply and return water, it will continue to increase in dissolved solids concentration, since only pure water would be permeating into the membrane stands and leaving the system as membrane system product effluent.

Figure 2:
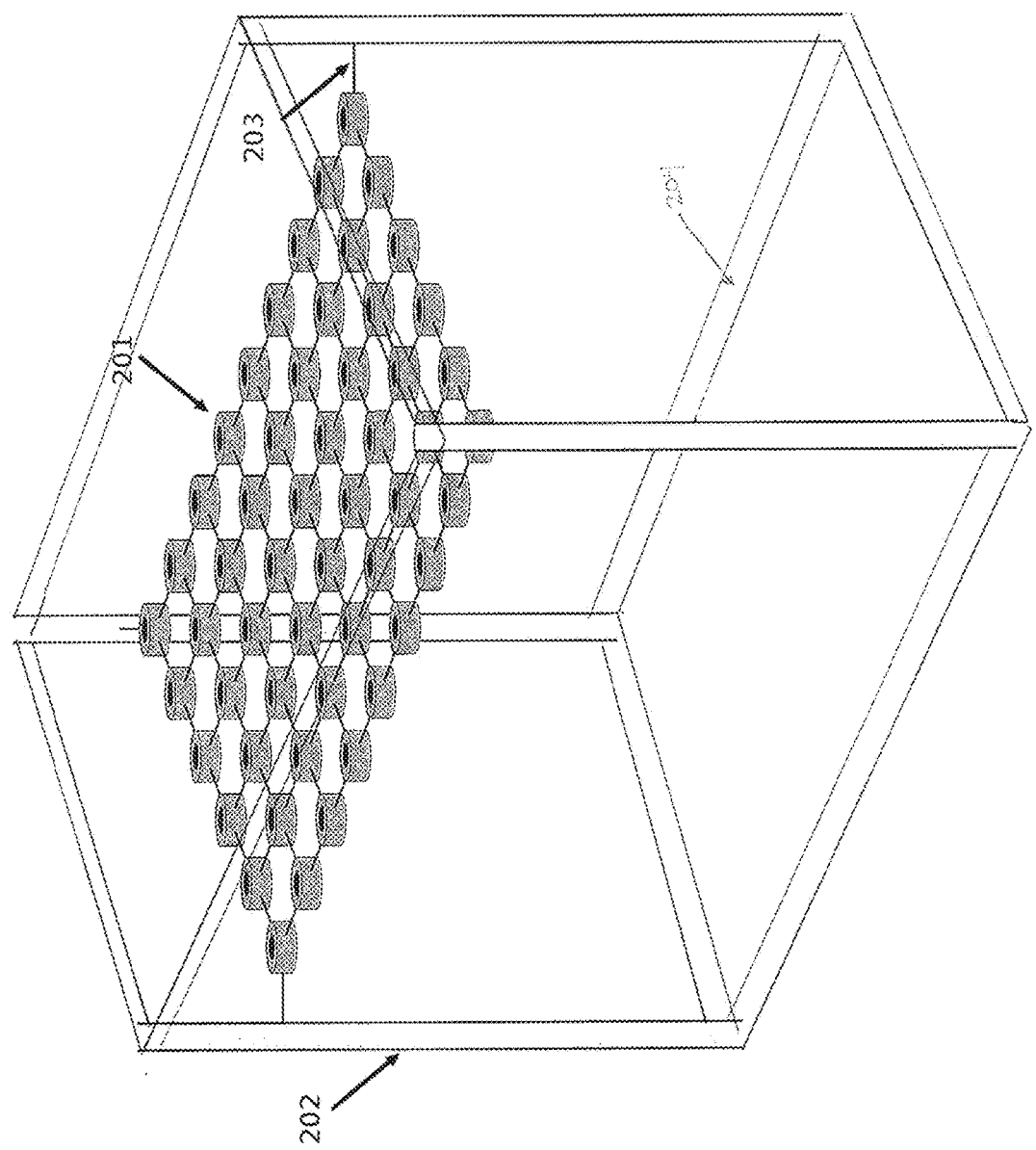
FIG. 2 is a perspective view of a single row of a lattice of ring magnets.

FIG. 2 is a view of just one layer of permanent, ring magnets rigidly connected to one another (201). This horizontal layer of magnets would be one of many other layers (the other layers are not shown for simplicity sake). Each magnet of each layer would be positioned one on top of the other, throughout the height of the hollow-fiber membrane system within the hollow-fiber membrane rigid frame. Each hollow-fiber membrane bundle is threaded down through the center of neighboring ring magnet layers. The hollow-fiber frame consists of four corner frame rails (202) and eight horizontal connector frames (204). Each layer of ring magnets is connected to each of the four corner frame rails (203) in such a way that the connection-point can be moved along the frame rail. If need be, all of the ring magnet layers can be slid down so that the magnet layer is lower than the valve (108) between the bottom socket and the top of the solid vertical tube (109), The hollow-fiber membranes and the additional ring magnet layers are not shown for simplicity sake. Each membrane bundle would be threaded through the center of a ring magnet throughout all of the magnet layers from the top header to the riser tube, directly down through the center of the neighboring ring magnet beneath it. Each magnet layer's corner magnet is connected to each corner post (203) such that the magnet layer's height can be adjusted. Therefore, the height of each magnet layer could be adjusted within the rigid frame, and if desired, the magnet layers could all be moved beneath the lower sockets (104) and valves (108), so that all of the magnetic nanoparticles can be removed and maintained away from the hollow fiber membranes, as an operational state.

Figure 3:
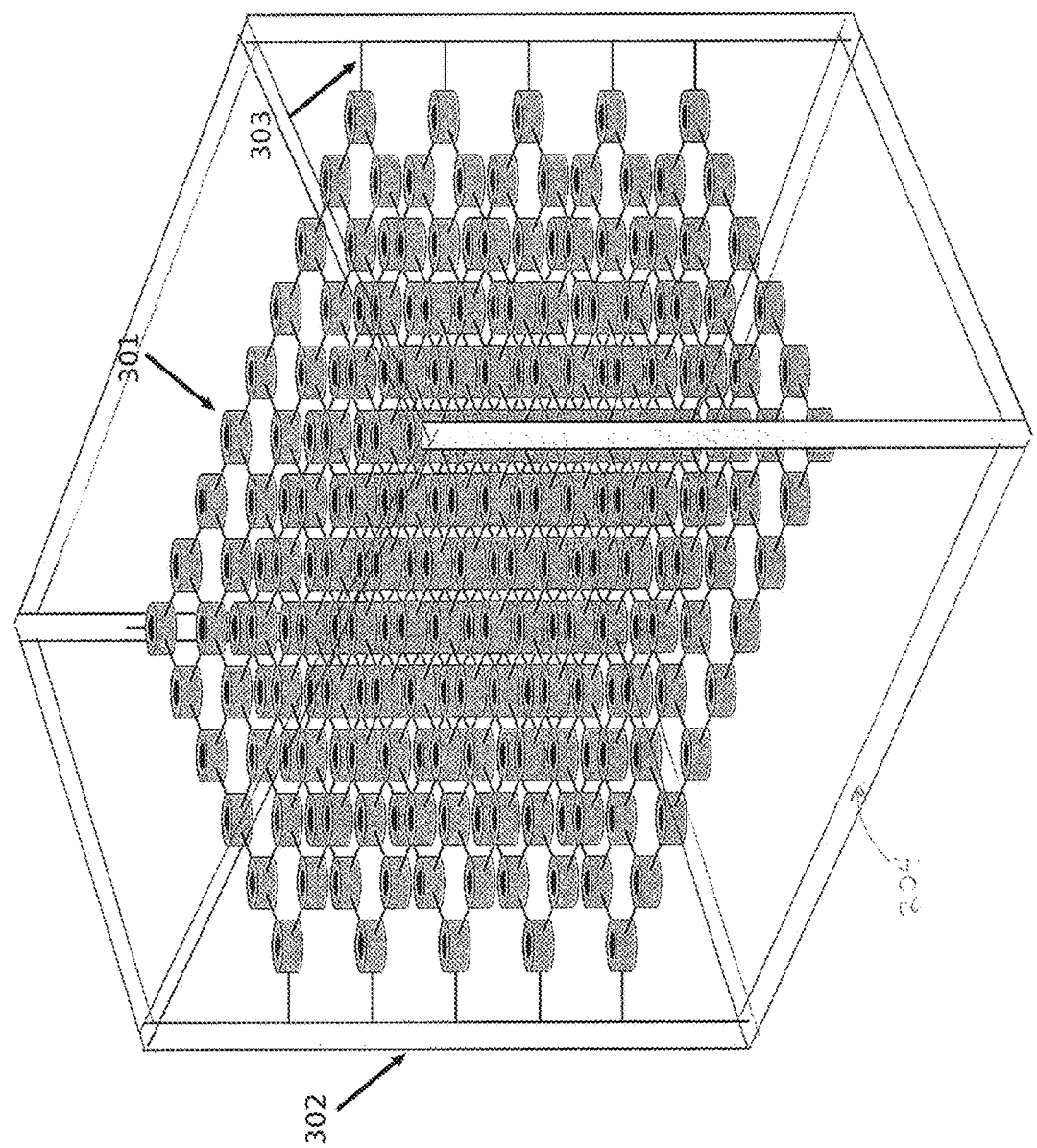
FIG. 3 is a perspective view of a multi-row lattice or strata of ring magnets.

FIG. 3 is a view of multiple magnet layers (5 layers are shown). The distance between each layer is determined by the relative magnetic force needed to provide the positional control of the magnetic nanoparticles inside the hollow fiber membranes. This distance is assumed to be approximately equal to the thickness of each magnet.

For the embodiment shown in FIG. 1, feedwater may be either wastewater or industrial cooling water to be purified or demineralized, or seawater to be desalinated. In FIG. 1, a forward osmosis membrane unit 102, is shown to be submerged in feedwater 101 within an enclosure having watertight walls and a metal frame 100. When used for desalination, the membrane system can be placed in-situ in seawater (be installed alongside a pier). In-situ use in a natural body of seawater is preferred as it minimizes Concentration Polarization (CP) because the more concentrated seawater near the membrane surface would be re-diluted by the surrounding bulk sea water. The natural movement of seawater from wave action and current flow has additional dilutive effects.

The heart of the invention is the submerged hollow fiber forward osmosis (FO) membrane unit 102, utilizing a magnetic nanoparticle draw solution (a ferrofluid) and a rigid lattice of permanent, ring magnets used to maintain the position of the draw solute nanoparticles in order to retain the nanoparticles within the membrane system (not shown in FIG. 1). The forward osmosis membrane system comprises a multiplicity of submerged hollow fiber membrane bundles. Each bundle contains a large number, typically 500 to 1,000 hollow fiber membranes. Each bundle is 'potted' into one of many (the figure shows 16 of them) sockets that connect to horizontal top headers (behind 103). The top headers are where the permeate exists within the membrane system. The bottom end of the hollow fiber membranes are also potted into sockets that are fitted into numerous vertical bottom headers. The bottom header sockets have valves between where the membrane stands are potted or glued into the socket and the socket's header fitting. The vertical bottom headers are rigidly mounted to the bottom of the membrane system frame, and are where the magnetic nanoparticles (the ferrofluid) are moved to, when the nanoparticles are removed from the active membrane surface area. The nanoparticles are moved by sliding each rigid magnet layer down below the valve level of the bottom socket. The ferrofluid can be physically isolated and kept away from the hollow fiber membranes, (within the vertical bottom headers) by closing the socket valves.

The hollow fiber membranes are small with an inside diameter in the range of 10 to 100 microns (a micron is one-millionth of a meter) and an outside diameter in the range of 25 to 200 microns. Smaller diameter hollow fiber membranes are preferred to larger diameter fiber membranes by having more membrane surface area per unit volume of FO membrane. The walls of the hollow fiber membranes have pores and thus function as a semi-permeable membrane. These pores are of such a size as to prevent passage of unwanted dissolved and suspended solids through the walls of the hollow fibers but allow for the passage of pure water into its interior.

The size of the pores determines the types of contaminants to be separated. Microfilter (MF) pores with diameters in the range of 0.01 to 1 microns typically prevent clay, bacteria, large viruses, and suspended solids from passing the membrane. Ultrafilter (UF) pores with diameters in the 0.001 to 0.01 micron range typically remove viruses, proteins, starches, colloids, silica, organics, and dyes. Nanofilter (NF) pores with diameters in the range of 0.0001 to 0.001 microns typically remove sugar, pesticides, herbicides and some divalent ions. Reverse osmosis, or hyperfilters, with pore diameters (of 0.1 to 1.0 nanometers, where 1 nanometer=0.001 micron) are capable of removing monovalent salts. The most common hollow fiber membrane materials, owing to their competitive performance and economic characteristics, are cellulose acetates, nitrates, and esters (CA, CN, and CE), polysulfone (PS), polyether sulfone (PES), polyacrilonitrile (PAN), polyamide, polyimide, polyethylene and polypropylene (PE and PP), polytetrafluoroethylene (PTFE), polyvinylidene fluoride (PVDF), polyvinylchloride (PVC). RO (hyperfilter) and some nanofilter membranes can be used for desalination. Nano, ultra and microfilters can be used for wastewater treatment, depending on the particle size that is the object of the wastewater treatment.

The draw solution should consist of pure water with a solution of superparamagnetic nanoparticles in suspension. Paramagnetism describes the characteristic that the nanoparticles are magnetic only while within an externally applied magnetic field and show no such magnetic characteristic absent the magnetic field. Therefore, the particles would not show a magnetic attraction to each other, but rather only in the direction of an external magnetic force field. The prefix 'super' in superparamagnetic refers to the nanoparticle's strength of magnetization and that it is many times greater than the magnetization of an ordinary paramagnetic particle. Superparamagnetism occurs when the nanoparticle is sufficiently small (~10 nm) so that the surface area is large relative to the particle's mass.

The types of superparamagnetic nanoparticles that are preferred have an iron oxide core with a silica shell. These are called superparamagnetic iron oxide nanoparticles, or SPIONs. Some of the other materials used to make the core of superparamagnetic nanoparticles are pure metals such as Fe, Ni and Co, and alloys such as $Fe_3O_4$, $Fe_2O_3$, $MgFe_2O_4$, $MnFe_2O_4$, $CoFe_2O_4$, $CoPt_3$, FePt, $FePt_3$ and CoO.

The silica shell around the SPION provides it with chemical stability by preventing the iron oxide core (preferably magnetite [$Fe_3O_4$], or maghemite [$Fe_2O_3$]), from oxidizing, preventing them from agglomerating, or sticking to a neighboring particle, and acts as a base that a functionalizing chemical dispersant coating can adhere to. Other inorganic shell materials of the core-shell nanoparticle include carbon, precious metals such as silver and gold, or their oxides, which can be created by gentle oxidation of the outer shell of the nanoparticles, or additionally deposited, such as $Y_2O_3$ (Yttrium oxide).

Chemical dispersants, also called surface ligands or polymers, are used to 'functionalize' the nanoparticle and thus maintain it in a stable suspension. In general, surfactants or polymers can be chemically anchored or physically adsorbed on magnetic nanoparticles, which creates repulsive forces (mainly as steric repulsion) to balance the van der Waals attractive forces acting on the nanoparticles. Thus, by steric repulsion, the magnetic particles are stabilized in suspension. When forming a stable, colloidal suspension, the nanoparticles are referred to as dissolved or hydrophilic. Polymers containing functional groups, such as carboxylic acids, phosphates, and sulfates, can bind to the surface of the nanoparticle. Suitable polymers for coating include poly (pyrrole), poly(aniline), poly(alkylcyanoacrylates), poly(m-ethylidene malonate), and polyesters, such as poly(lactic acid), poly(glycolic acid), poly(e-caprolactone), and their copolymers.

It is preferred that the paramagnetic nanoparticle be larger than the membrane's pores to prevent a nanoparticle from penetrating a membrane, yet small enough to produce a large osmotic pressure across the membrane. The current state-of-the-art limit to how small the size of such a particle can be is 2 to 3 nanometers.

Feedwater permeating the membrane is hydraulically forced to the top series of headers because the bottom headers are valved closed. Each membrane bundle is potted into a top header (of which there are approximately 16 shown in the figure), and each top header has a fitted connection to the collection header 103. Therefore, there is a continuous flow of water that originates as feedwater, that permeates through the hollow fiber membrane, is collected in the series of top headers, and flows into the collection header 103. The permeate exits the submerged membrane unit through a water-tight fitting collection header 105.

The magnetic fields are created by a series of permanent, ring magnets positioned around a bundle of hollow fiber membranes. A bundle of membranes can number in the tens to hundreds of hollow fibers. Five different types of permanent, ring magnets are shown in FIGS. 4 through 7. They are described as axial, lateral (of which there are two different types), multi-pole, and uni-polar. The north-pole end of the magnet is shown in black and the south-pole end is shown as light gray. The direction of the field force is always from the south-pole toward the north-pole.

The selection and application of one or more of a particular type of ring magnet within the submerged hollow fiber membrane system is intended to counter-act the forces created by the water as it permeates the membrane. The two water forces affecting the position of the nanoparticles are; 1) the incoming water permeating the membrane, pushing the nanoparticle away from the membrane's active surface area, and 2) the linear flow of permeate water through the hollow fiber membrane. Furthermore, the magnetic fields created by the series of magnets, are designed to maintain the optimal nanoparticle position (its physical location within the hollow fiber) at the active surface of the membrane, such as to result in the highest osmotic pressure and greatest resulting water flux rate that can be achieved. The selection of the type of magnet and its position along the fiber length may alternate (for example, axial followed by radial, then followed by axial, etc.).

It is understood that the permanent ring magnets disclosed within this document can be used in addition to or place of any one or more of the electromagnets disclosed within this document's parent applications, namely U.S. Pat. Nos. 9,242,213 and 9,334,748; incorporated by reference herein.

Figure 4:
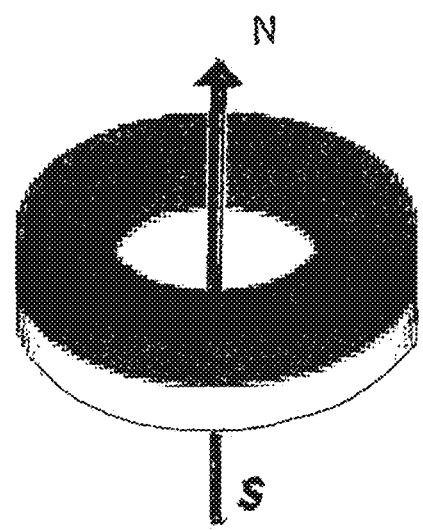
FIG. 4 is a perspective view of an axial ring magnet with related schematic illustrating polarity.
Figure 4:
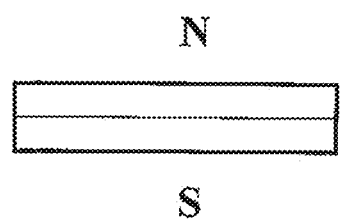

Referring to FIG. 4, an axial ring magnet comprises a north and south end of a magnet and produces a magnetic field force that is directed axially relative thereto. The direction of the magnetic force influences the magnetic nanoparticles (MNP) along the axis of the ring magnet in the direction of the arrow in the FIG. 4. When used in relation to an osmosis system, the axial direction of the magnetic force counters any flow force of the permeate water from moving the nanoparticles along the length (i.e., axially) of the hollow fiber membranes located within the center of, or encircled by, the axial ring magnet. The axial ring magnets may thus be used in place of, or in addition to, one or more of the electromagnets of the forward osmosis (FO) systems of U.S. Pat. No. 9,242,213 and/or in place of, or in addition to one or more of the electromagnets of the pressure retarded osmosis (PRO) systems of U.S. Pat. No. 9,344,748.

Thus, in the embodiment of FIGS. 1b and 1c of parent registration U.S. Pat. No. 9,242,213, the use of one or more axial ring magnets rigidly and connected in a lattice 113 within the forward osmosis (FO) system prevents the paramagnetic nanoparticles from exiting the hollow fiber membrane system. The lattice (FIG. 2 of the present application) near the top of the membrane unit of FIGS. 1b and 1c of registration U.S. Pat. No. 9,242,213 creates a magnetic field with the corresponding lines of flux pointing in the downward direction so as to retain the nanoparticles within the membrane unit. This prevents the nanoparticles from being forced out through the top of the hollow fiber membrane system. The multi-row lattice or strata of FIG. 3 of the present application may also use one or more of the axial ring magnets within the embodiments of FIGS. 1b and 1c of parent registration U.S. Pat. No. 9,242,213 as well. Used in this configuration, each row of the lattice within the membrane unit creates a magnetic field with the corresponding lines of flux pointing in the downward direction so as to retain the nanoparticles within the membrane unit throughout the length of the hollow fibers. The foregoing use of one or more axial ring magnets may also be utilized in the embodiments of FIGS. 1 and 5 of parent registration U.S. Pat. No. 9,334,748 utilizing single and multi-row lattices, respectfully, to prevent the paramagnetic nanoparticles from exiting the hollow fiber membrane system of pressure retarded osmosis (PRO) systems as well.

The same single row lattice of one or more axial ring magnets of FIG. 1 of parent registration U.S. Pat. No. 9,334,748 may also be used to stop the operation of a PRO system via the removal of the ferrofluid from the membrane surface area. In utilizing one or more of the axial ring magnets in place of or in addition to one or more of the electromagnets discussed in para [0040] and illustrated in FIG. 1 of U.S. Pat. No. 9,334,748, the lattice of the PRO unit travels from the top to the bottom along tracks located on the inside walls of the water-tight enclosure. As the lattice moves from the top to the bottom, its magnetic field sweeps the magnetic nanoparticles on the inside of the hollow fiber membranes, from top to bottom. The magnetic nanoparticles are forced by the moving magnetic field, to the bottom membrane headers 112, to the bottom effluent header 113, out of the water-tight enclosure 103, through the bulk-head fitting 110 to the effluent header 109 through an isolation valve 111, and to the magnetic nanoparticle isolation tank 114. The magnetic nanoparticle removal procedure therefore separates the nanoparticles from the membrane surface area thereby preventing water flux and the corresponding increase of hydrostatic pressure within the membrane system, and prepares the PRO system for maintenance or sub-system disassembly.

Figure 5:
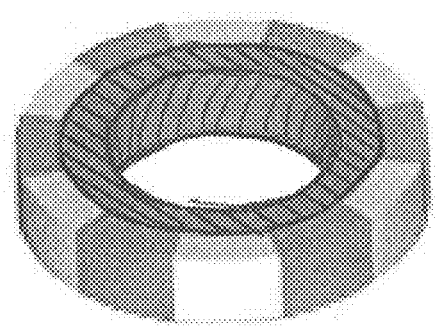
FIG. 5 is a perspective view of a lateral ring magnet with related schematic illustrating polarity.
Figure 5:
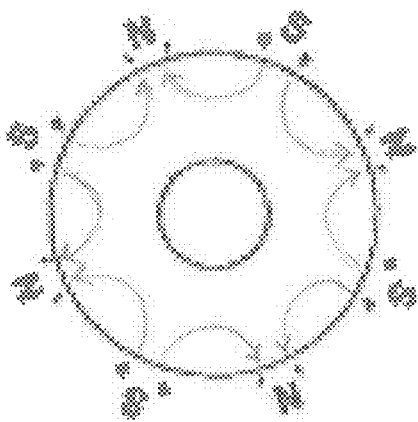

Referring to FIG. 5 of the present application, a lateral field ring magnet shape can be classified as an outer-diameter Halbach, or an inner-diameter Halbach (not illustrated). The outer-diameter Halbach consists of alternating north and south magnetic material sections on the outside perimeter of the magnet, with a non-magnetic material on the inside perimeter. The inner-diameter Halbach ring magnet (not illustrated) has the north and south magnetic material sections forming the inside of the ring, with the non-magnetic material on the outside perimeter of the ring. The magnetic field shape loops from each south-pole arc to its two neighboring north-pole arcs. The magnetic nanoparticle solution within the hollow fibers, going through the center of the ring magnet, is forced toward the nearest north-pole arc section. When used in relation to an osmosis system, the north-pole direction of the magnetic force counters any flow force of the permeate water from moving the nanoparticles laterally (i.e., radially) away from the surface area of the membrane located within the center of, or encircled by, the axial ring magnet.

Because the electromagnets of the forward osmosis (FO) systems of U.S. Pat. No. 9,242,213 and pressure retarded osmosis (PRO) systems of U.S. Pat. No. 9,334,748 influence the nanoparticles linearly (i.e., axially) to counter any flow force of the permeate water from moving the nanoparticles along the length (i.e., axially) of the hollow fiber membranes located within the center of, or encircled by, the donut-shaped electromagnet, one or more lateral ring magnets may be utilized with the electromagnets to counter any flow force of the permeate water from moving the nanoparticles laterally (i.e., radially) away from the surface area of the membrane located within the center of, or encircled by, the axial ring magnet. Thus, the lateral ring magnets may be placed in alternating relation with the electromagnets within the lattices of FIGS. 1 and 3 in the present application for utilization within the embodiments of the respective FO and PRO systems of parent registrations U.S. Pat. Nos. 9,242,213 and 9,334,748. The alternating placement of these two magnet types thus effectively counter the two water forces affecting the position of the nanoparticles, i.e., 1) the incoming water permeating the membrane, pushing the nanoparticle away from the membrane's active surface area, and 2) the linear flow of permeate water through the hollow fiber membrane, to maintain the optimal nanoparticle position (its physical location within the hollow fiber).

Figure 6:
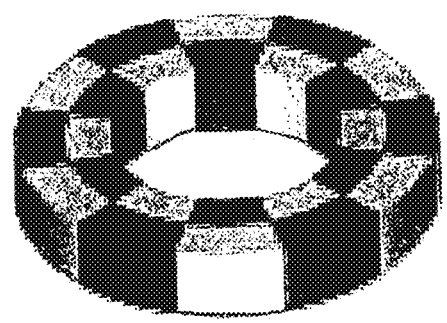
FIG. 6 is a perspective view of an multi-pole ring magnet with related schematic illustrating polarity.
Figure 6:
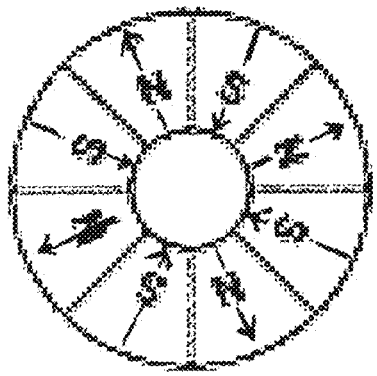

Referring to FIG. 6, the multi-pole ring magnet comprises north and south magnetic material arcs, with each arc in an alternating pattern, on the inside and outside of the ring. The resulting magnetic field shape is in all cases radial relative to the ring magnet, with field forces pointing toward, and pointing away from the center of the ring, in alternating fashion according to each respective magnetic arc. Similar to the resultant of the magnetic forces of the lateral ring magnet of FIG. 5, the magnetic nanoparticle solution within the hollow fibers, going through the center of the ring magnet, is forced toward the nearest north-pole arc section. When used in relation to an osmosis system, the north-pole direction of the magnetic force again to counters any flow force of the permeate water from moving the nanoparticles laterally (i.e., radially) away from the surface area of the membrane located within the center of, or encircled by, the axial ring magnet.

Because the electromagnets of the forward osmosis (FO) systems of U.S. Pat. No. 9,242,213 and pressure retarded osmosis (PRO) systems of U.S. Pat. No. 9,334,748 influence the nanoparticles linearly (i.e., axially) to counter any flow force of the permeate water from moving the nanoparticles along the length (i.e., axially) of the hollow fiber membranes located within the center of, or encircled by, the donut-shaped electromagnet, one or more multi-pole ring magnets may be utilized with the electromagnets to counter any flow force of the permeate water from moving the nanoparticles laterally (i.e., radially) away from the surface area of the membrane located within the center of, or encircled by, the axial ring magnet. Thus, the mutli-pole ring magnets may be placed in alternating relation with the electromagnets within the lattices of FIGS. 1 and 3 in the present application for utilization within the embodiments of the respective FO and PRO systems of parent registration U.S. Pat. Nos. 9,242,213 and 9,334,748. The alternating placement of these two magnet types thus effectively counter the two water forces affecting the position of the nanoparticles, i.e., 1) the incoming water permeating the membrane, pushing the nanoparticle away from the membrane's active surface area, and 2) the linear flow of permeate water through the hollow fiber membrane, to maintain the optimal nanoparticle position (its physical location within the hollow fiber).

Figure 7:
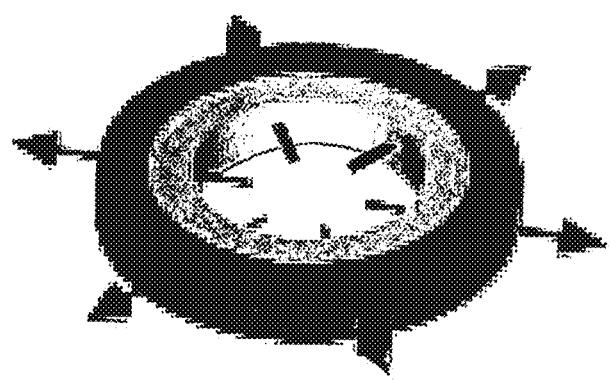
FIG. 7 is a perspective view of an uni-polar ring magnet with related schematic illustrating polarity.
Figure 7:
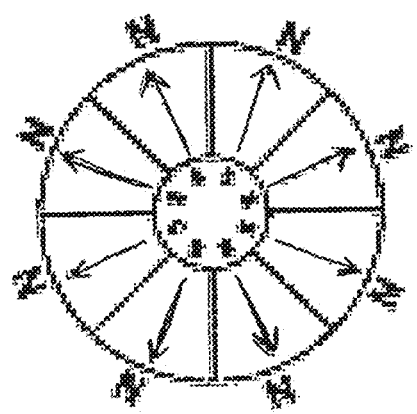

Referring to FIG. 7, the uni-polar radial ring magnet comprises south-pole magnetic material on the inside of the ring, and north-pole magnetic material on the outside of the ring. The resulting magnetic field is radial, with the direction of magnetic flux pointing from the center of the ring toward the outside of the ring. Magnetic nanoparticles within the hollow fiber membrane stands, bunched together on the inside of the ring, are magnetically forced toward the outside of each respective hollow fiber membrane to the side closest to the ring magnet to counter any flow force of the permeate water from moving the nanoparticles laterally (i.e., radially) away from the surface area of the membrane located within the center of, or encircled by, the axial ring magnet.

Because the electromagnets of the forward osmosis (FO) systems of U.S. Pat. No. 9,242,213 and pressure retarded osmosis (PRO) systems of U.S. Pat. No. 9,334,748 influence the nanoparticles linearly (i.e., axially) to counter any flow force of the permeate water from moving the nanoparticles along the length (i.e., axially) of the hollow fiber membranes located within the center of, or encircled by, the donut-shaped electromagnet, one or more uni-polar ring magnets may be utilized with the electromagnets to counter any flow force of the permeate water from moving the nanoparticles laterally (i.e., radially) away from the surface area of the membrane located within the center of, or encircled by, the axial ring magnet. Thus, the uni-polar ring magnets may be placed in alternating relation with the electromagnets within the lattices of FIGS. 1 and 3 in the present application for utilization within the embodiments of the respective FO and PRO systems of parent registration U.S. Pat. Nos. 9,242,213 and 9,334,748. The alternating placement of these two magnet types thus effectively counter the two water forces affecting the position of the nanoparticles, i.e., 1) the incoming water permeating the membrane, pushing the nanoparticle away from the membrane's active surface area, and 2) the linear flow of permeate water through the hollow fiber membrane, to maintain the optimal nanoparticle position (its physical location within the hollow fiber). Again, the desired result of each of the foregoing ring magnets (i.e., axial, lateral, multi-pole, and uni-polar) is to maintain the optimal nanoparticle position (its physical location within the hollow fiber) at the active surface of the membrane, such as to result in the highest osmotic pressure and greatest resulting water flux rate that can be achieved. Thus, as in the foregoing examples utilizing lateral, multi-pole and/or unipolar ring magnets in alternating fashion with electromagnets within the lattices of FIGS. 2 and 3 of the present application, the lateral, multi-pole and uni-polar magnets may be used in alternating fashion with the axial ring magnets as well.

While this foregoing description and accompanying figures are illustrative of the present invention, other variations in structure and method are possible without departing from the invention's spirit and scope.

I claim:

1. A forward osmosis system for water purification and seawater desalination comprising:
   a rigid enclosure filled with feedwater that is to be purified;
   an array of bundles of hollow fiber membranes, each membrane defining a multiplicity of pores and permeated by a feedwater, each bundle securely attached to a rigid vertical tube at a bottom of the bundle and a water collection header at a top; and
   a draw solution on an inside of the hollow fiber membranes consisting of a suspension of superparamagnetic nanoparticles in pure water, the superparamagnetic nanoparticles each having both a diameter larger than the diameter of the pores of the hollow fiber membranes, and an iron oxide core and a silica shell coated with a dispersant such that the superparamagnetic nanoparticles form a colloidal suspension with a high osmotic potential.

2. A forward osmosis system as set forth in claim 1 further comprising an array of permanent ring magnet layers, each layer comprised of rigidly connected ring magnets, each ring magnet defining a through center and generating a magnetic field, the bundles of hollow fiber membrane threaded through the center of the respective ring magnet of each layer.

3. A forward osmosis system as set forth in claim 2 wherein the magnetic fields generated by the ring magnets of of each layer maintain a position of the superparamagnetic nanoparticles at a membrane working surface of each hollow fiber membrane of the respective bundles such both an osmotic pressure and a permeate water flux rate is maximized.

4. A forward osmosis system as set forth in claim 3 wherein the magnetic fields of the ring magnets draw or attract the magnetic nanoparticles toward the membrane surface of each hollow fiber membrane of the respective bundles to negate an effect of an incoming permeate water which would otherwise dilute the draw solution at the membrane surface and cause dilutive Concentration Polarization that results in a reduction of the osmotic pressure and permeate water flux rate.

5. A forward osmosis system as set forth in claim 4 where the permanent ring magnets maintain a locational position of the magnetic nanoparticle within the bundles of hollow fiber membrane and each define a magnetic field shape selected from a group consisting of axial, lateral, multi-pole, and uni-polar shapes.

6. A forward osmosis system as set forth in claim 5 wherein each layer of permanent ring magnets is rigidly connected in a horizontal layer, the bundles of hollow fiber membrane threaded through the centers of the respective ring magnets of each layer from a top of the bundles to a bottom.

7. A forward osmosis system as set forth in claim 6 wherein each layer of permanent ring magnets is individually adjustable with respect to height and slidably movable to the bottom of the membrane bundles so as to be positioned below a lower end of the membrane to magnetically remove the draw solutions from the membrane surfaces and eliminate the osmotic pressure and permeate water flux rate.

* * * * *